United States Patent [19]

Prins

[11] Patent Number: 4,946,344
[45] Date of Patent: Aug. 7, 1990

[54] GENERAL CARGO CRANE

[75] Inventor: Willem F. Prins, Zandvoort, Netherlands

[73] Assignee: B.V. Machinefabriek Figee, Haarlem, Netherlands

[21] Appl. No.: 281,829

[22] Filed: Dec. 8, 1988

[30] Foreign Application Priority Data

Dec. 8, 1987 [NL] Netherlands ............... 8702962

[51] Int. Cl.⁵ ............................................. B65G 67/00
[52] U.S. Cl. ............................. 414/137.1; 414/592; 414/140.2; 414/140.3; 414/139.4
[58] Field of Search .............. 414/137.1, 139.5, 140.2, 414/139.4, 139.9, 140.3, 140.8, 141.3, 592, 10, 142.6, 142.8

[56] References Cited

U.S. PATENT DOCUMENTS

| | | | |
|---|---|---|---|
| 1,525,950 | 2/1925 | Prescott | 414/141.3 X |
| 4,676,364 | 6/1987 | Ammeraal | 414/140.8 X |
| 4,739,876 | 4/1988 | Ammeraal | 198/799 |

FOREIGN PATENT DOCUMENTS

| | | | |
|---|---|---|---|
| 0180218 | 7/1986 | European Pat. Off. | |
| 3533457 | 3/1987 | Fed. Rep. of Germany | 414/140.8 |
| 2419893 | 10/1979 | France | 414/141.3 |
| 0115880 | 9/1979 | Japan | 414/141.3 |
| 8501415 | 12/1986 | Netherlands | |
| 187621 | 11/1966 | U.S.S.R. | |

*Primary Examiner*—David A. Bucci
*Assistant Examiner*—James Eller
*Attorney, Agent, or Firm*—Webb, Burden, Ziesenheim & Webb

[57] ABSTRACT

A general cargo crane for unloading general cargo from a ship's hold, in particular general cargo placed on a pallet, comprises a continuously operating conveyor in a shaft of which at least the bottom part is vertically displaceable. To solve the problem how general cargo can be introduced into the continuously operating conveyor smoothly and with a minimum of manpower, provision is made at the lower end of the shaft (4) for a cage-type frame (15) which is provided at least one side with a deposit platform (16a, 16b) and lifting elements (17, 18) for moving the deposit platform between a lower position in which general cargo can be deposited on the platform and a higher position in which the general cargo can be transferred to the continuously operating conveyor. The cage is provided with a fixed transfer platform (19) at the level of the higher position of the deposit platform, wherein sliding plates (21-26) are present for transferring general cargo standing on the deposit platform in the higher position thereof onto the transfer platform and a push arm is present (28, 29) for transferring general cargo standing on the transfer platform from the transfer platform to the continuously operating conveyor.

9 Claims, 11 Drawing Sheets

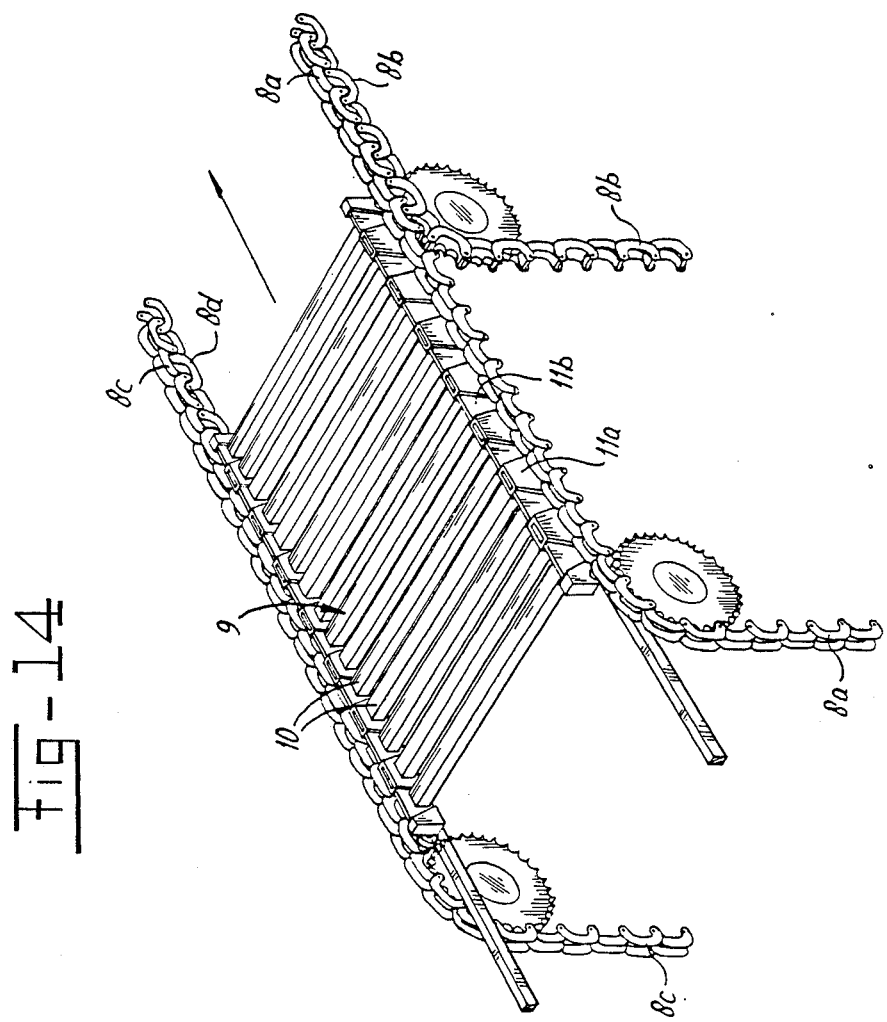

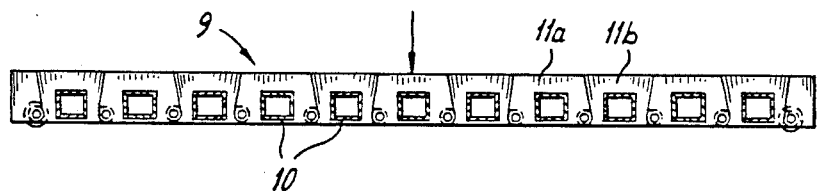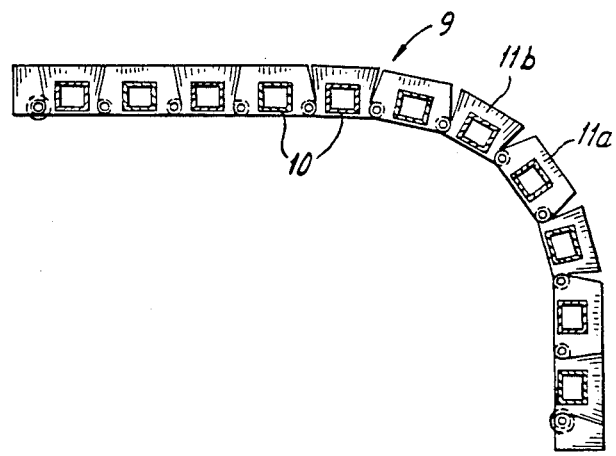

GENERAL CARGO CRANE

INTRODUCTION

The invention relates to a general cargo crane for unloading general cargo from a ship's hold, in particular general cargo placed on a pallet, comprising a vertical shaft and a horizontal conveying part, conveying means for vertical and horizontal conveyance being disposed in said shaft and horizontal conveying part respectively, and said shaft being vertically displaceable at least with its bottom part. Such a crane is known from EU-A-0189218.

SUMMARY OF THE PRIOR ART

Major improvements in efficiency and mechanization have been carried out in the past few decades in the loading process for ships. While freighters loaded with general cargo used to be the norm, we now have container ships, bulk carriers, ro-ro ferries etc. The loading system is highly mechanized for these ships. There is, however, still some limited technical development being carried out in current general cargo loading via pallets and in boxes. The relatively low efficiency of pallet loading has led to a shrinkage in this sector; there has been little or no increase in productivity in the general cargo sector. In particular, there has until now been no solution to the problem of mechanization of the unloading process.

However, general cargo transportation by sea is a very good way of meeting the requirements in ports of developing countries, since this type of transport is particularly suitable for packed consignments of great diversity in both the type and the size of the consignment. In transport by sea general cargo transport has the advantage that a great loading density can be obtained using simple vessels of varying dimensions. Although palletization has led to the introduction of an international measurements standard, carrying general cargo on pallets is under pressure due to the fact that in the ports of highly developed countries the loading process is inefficient by the standards in those places. Labour-intensive loading processes lead to too lengthy lay times, and thus to high harbour dues and demurrage.

If a considerable improvement could be achieved in the efficiency and costs of general cargo unloading in the ports of highly developed countries, palletized general cargo transport could hold its own and even develop. The flexibility in type of cargo and size of ship in particular offers great prospects.

Conveying systems are known in which general cargo consignments can be carried automatically from a ship's hold to a destination, for example a dock quay. One of these systems is the "Z-loda system" of the American company Z-Loda Systems Engineering, Inc., New Canaan, Conn. In this system loading platforms which are suspended at equal intervals from chains are displaceable along vertical and horizontal routes. The loading platforms are made up of sections, for example tubular sections, which are provided at both ends with links, successive links of the sections being hingedly connected to each other and being of such shape that in a position in which they form a flat plane they can pivot in only one direction. In vertical cargo conveyance routes the horizontal platforms are suspended from a chain at each of their four corner points. In the vertical return conveyance routes and the major part of the horizontal conveyance routes the chains are joined to form pairs which can run over the same chain wheels. Details of this system are described in US Pat. Nos. 3,583,550, 3,653,490 and 3,578,145, and in a leaflet produced by Z-Loda Systems.

One problem is how general cargo which is not brought in automatically can be introduced into the continuous conveying system smoothly and with a minimum of manpower. An infeed system suitable for this purpose will have to have such dimensions that it can be lowered through ship's hatches.

SUMMARY OF THE INVENTION

The invention provides a solution to this problem. According to the invention, for this purpose provision is made at the bottom end of the shaft for a cage-type frame which is provided at at least one side with a deposit platform and lifting means for moving the deposit platform between a lower position in which general cargo can be deposited on the platform and a higher position in which general cargo can be transferred to a continuously operating conveyor.

All kinds of possibilities exist for moving the deposit platform to the above-mentioned higher position. For example, the deposit platform could be attached to a carriage which can be drawn upwards along a slanting rail. It is, however, preferable to have a crane whose cage has a fixed transfer platform at the level of the higher position of the deposit platform, means being present for transferring general cargo standing on the deposit platform in a higher position thereof onto the transfer platform, and means also being present for transferring general cargo standing on the transfer platform from said platform to the continuously operating conveyor. This device is compact and operates efficiently.

In order to ensure that where pallets are used bars at the bottom side of the pallet are not loaded in shear in the unfavourable crosswise direction, with a great risk of damage, the deposit platform is provided with a recess containing a sliding plate, said means for transferring the general cargo from the deposit platform to the transfer platform shifting the sliding plate holding the general cargo. Cables which are each guided round a driven cable drum and a number of guide pulleys can be used to displace the sliding plate.

Very rapid working can be achieved with such a device. For example, a capacity of 240 items per hour can be achieved.

For the transfer of general cargo standing on the transfer platform from said platform to the continuously operating conveyor it is preferable to use means comprising a hydraulically or pneumatically operating push arm which is suspended in such a way that it pivots in the cage.

It is extremely important that the infeed device should be capable of itself breaking into a layer of pallets provided with general cargo and placed on the floor of a ship's hold. The cage-type frame therefore has fitted on it a device for breaking into the cargo of the hold of a ship, in the form of a swivelling arm and a hoisting trolley which can be moved along it.

In order to make hand pallet trucks—which after breaking in pick up the pallets and transport them to the deposit platform—travel easily over said deposit platform, the deposit platform is provided with two ramp parts for said trucks.

The conveying means for horizontal and vertical transportation comprise platforms which are suspended from chains and which are made up of sections fixed to links of such shape that they can pivot in only one direction from the distance between them in which the sections form a flat plane. At the same level as and adjacent to the fixed transfer platform of the infeed device the conveying system has chain return pulleys, by means of which a platform of the conveying system can be guided into a load-taking position in such a way that the front edge of the platform moves away from the transfer platform, while control means are present for operating the push arm of the infeed device once the front edge of a platform begins to move away from the transfer platform on formation of the load-taking position. Through the hinged suspension of the infeed device and control of the pivoting by hydraulic or pneumatic cylinders or the like, when the ship lists the deposit platform can remain on the floor of the hold, while the shaft remains suspended vertically. The bottom edge of this shaft can be raised and lowered periodically as a compensation for rising or falling of the ship during loading. A pallet with load standing on the fixed transfer platform can be fed onto a platform of the continuous conveying system smoothly and without any risk of damage to the pallets.

Moreover, the use of the infeed device is not restricted to the Z-loda conveying system.

BRIEF DESCRIPTION OF THE DRAWINGS

The invention will now be explained in greater detail with reference to the figures, in which an example of an embodiment is shown.

FIG. 14 shows in perspective a detail of the conveying system according to FIG. 13.

FIGS. 15 and 16 show side views of the platforms to be used in the conveying systems.

DETAILED DESCRIPTION OF THE INVENTION

Figure 1:
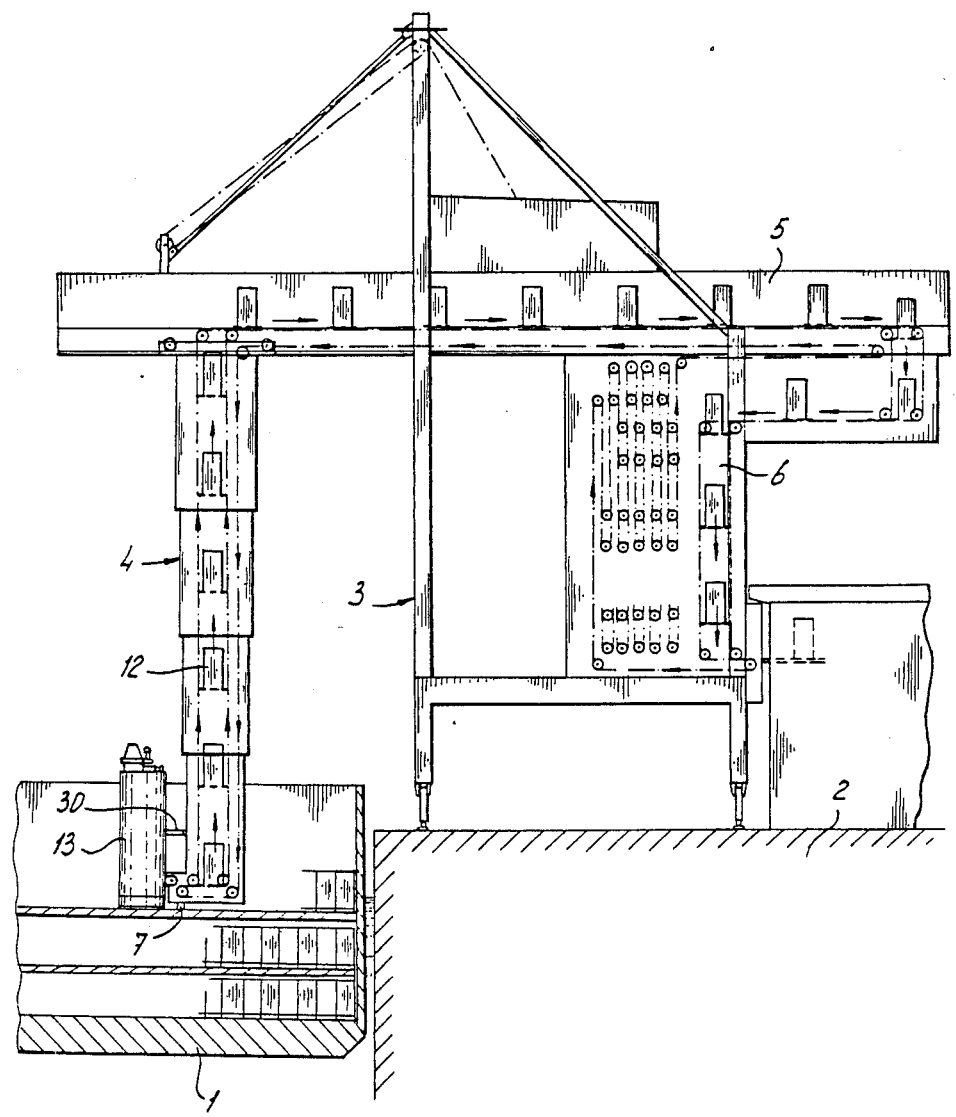
FIG. 1 shows a side view of a crane for unloading ship's holds in which palletized general cargo is stowed.

The device shown is intended for unloading ships laden with general cargo, preferably palletized general cargo.

A ship for unloading is indicated by 1, and the quay by 2. A crane 3 having a continuously operating conveying system which will be described in greater detail is mobile on the quay. Said crane has a vertical shaft 4 for insertion in the ship, a horizontal bridge part 5, and a discharge part 6. The vertical shaft 4 can be moved along the bridge part or together with the bridge part horizontally at right angles to the direction of the quay, and comprises parts which can be moved telescopically relative to each other, or is one vertically displaceable unit. Through movement of the crane 3 along the quay and of the vertical shaft 4 along the bridge part 5, the bottom end of the shaft 4 can be manoeuvred precisely above an open hatch, following which the shaft is extended telescopically, or lowered in its entirety, until the bottom edge with a switch 7 comes into contact with a cargo or a deck.

The conveying system in the crane is the Z-loda system which is known per se, and a number of details of which are shown in FIGS. 13 to 16.

The Z-loda system comprises four endless chains 8a to 8d, in which platforms 9 are suspended at equal intervals. The chains are combined in the vertical conveying routes and the non-conveying horizontal routes to pairs 8a, 8b, 8c, 8d. Each pair can run over a deflection or drive chain wheel. The platforms 9 are made up of tubular sections 10 which are spaced apart, and which are attached at their ends to chain links 11a, 11b of such shape that the links can pivot in only one direction from the position in which the sections 10 form a flat plane. FIG. 15 shows by means of an arrow the load which can be exerted on a platform 9, while FIG. 16 shows the bend of a platform.

In FIG. 1 the directions of movement of the platforms are shown by arrows.

The platforms 9 are intended for conveying to the quay 2 palletized general cargo 12 from a ship's hold. The conveying system in the crane 3 operates continuously. For the infeed of batch-fed pallets into said conveying system use is made of an infeed device 13, which is hingedly connected at 14 to the bottom part of the vertical shaft 4.

This infeed device 13 comprises a cage 15 having a deposit platform 16a, 16b on either side. Each of these deposit platforms is fastened to a frame 17 which can be moved up and down a certain distance along side posts of the cage 15 by means of a winch 18. In the top position of each deposit platform the top face thereof is at the same height as the top face of a transfer platform 19 which is fixed in the cage 15.

Figure 3:
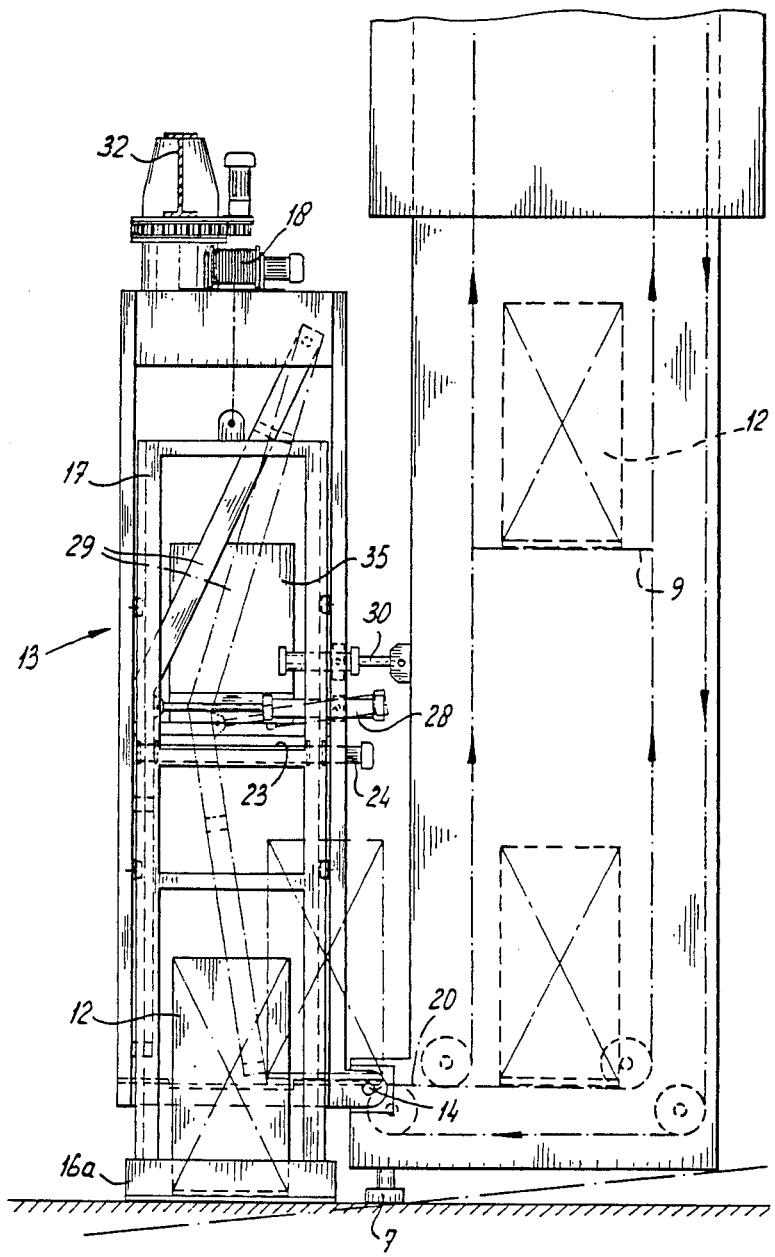
FIG. 3 shows a side view of the device according to FIG. 2.
Figure 4:
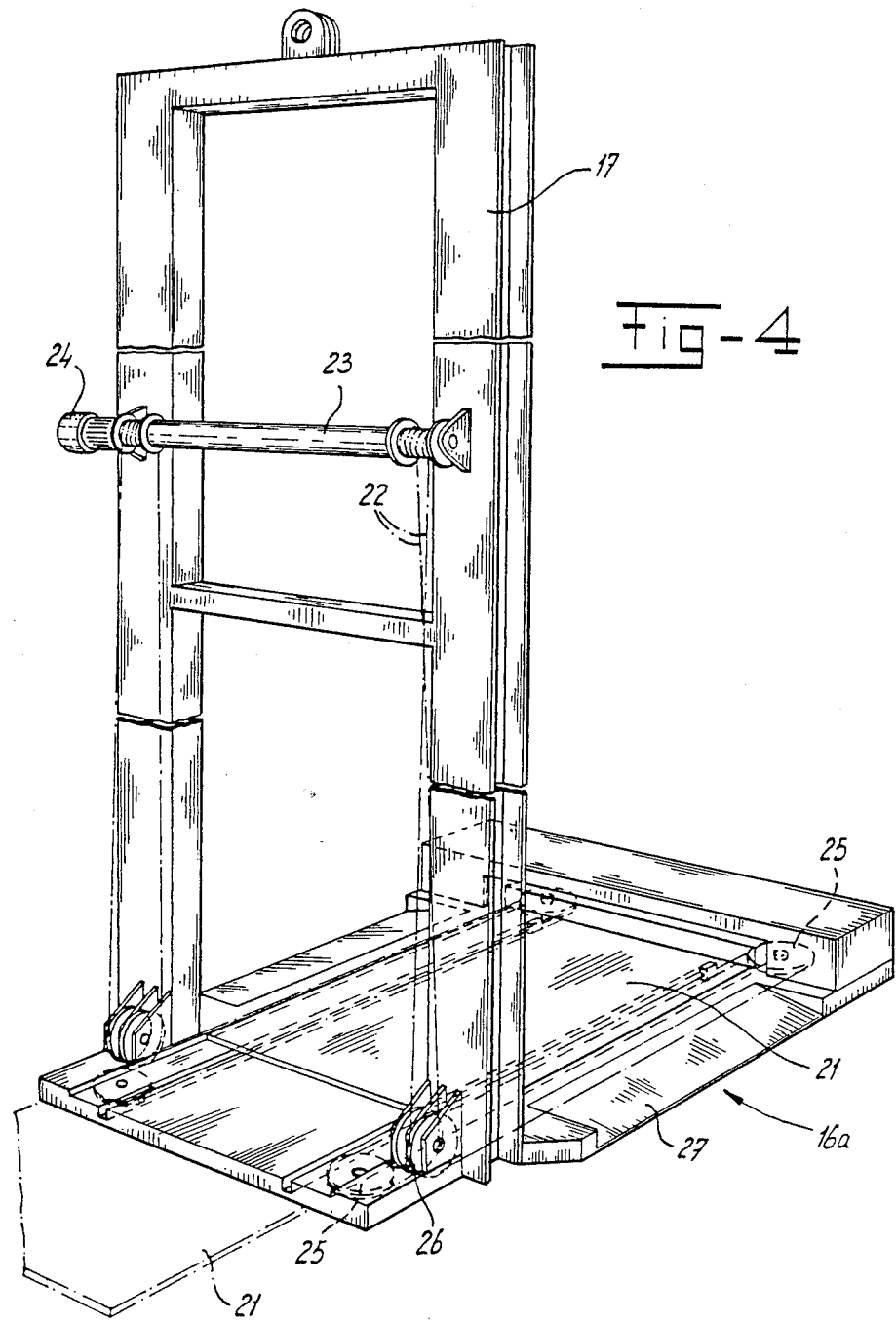
FIG. 4 shows a perspective view of means for displacing a sliding plate, to be used with the infeed device according to FIGS. 2 and 3.
Figure 13:
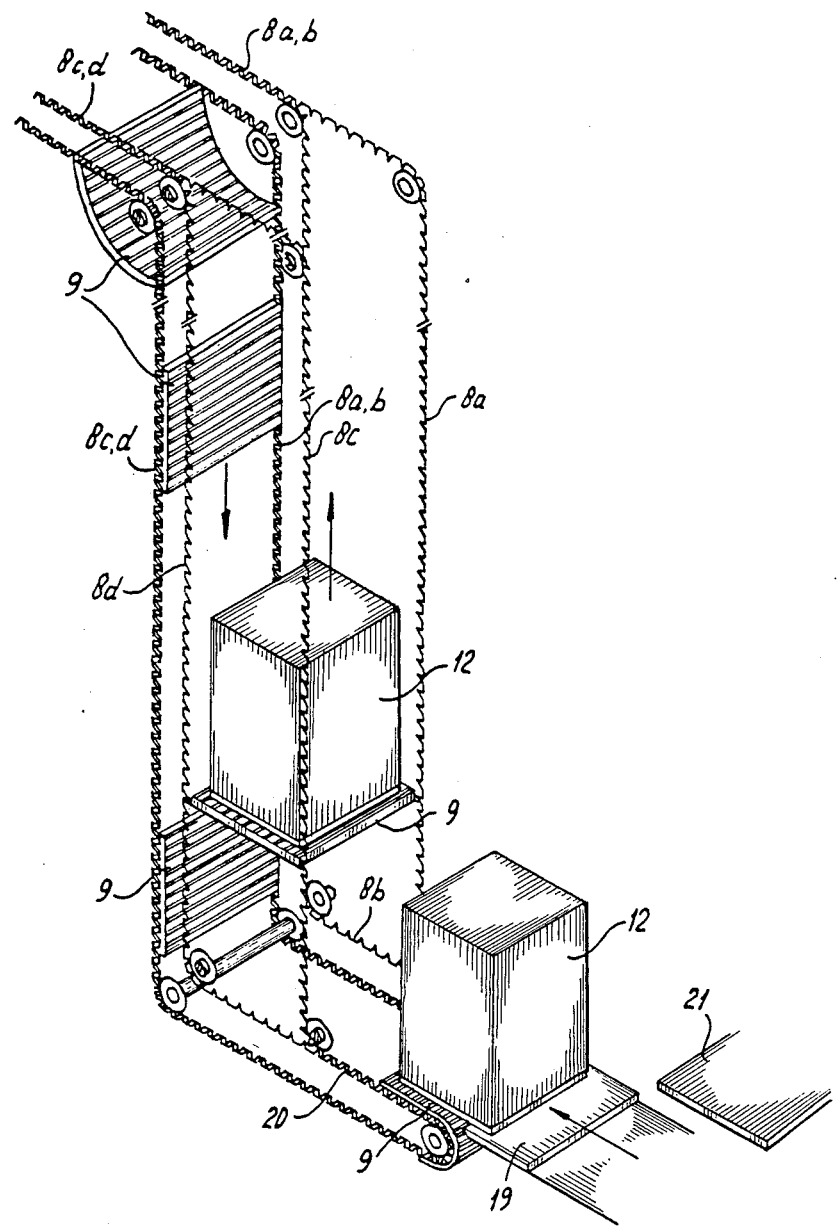
FIG. 13 shows rather schematically a perspective view of the continuous conveying system.

The conveying system in the vertical shaft 4 has at its bottom end a horizontal conveying part 20 (FIGS. 3 and 13). A platform 9 moved in this part into the horizontal load-taking position is lying at the same height as the transfer platform 19 in the cage 15 (FIG. 3.).

Each of the deposit platforms 16a, 16b is provided with a recess in which a sliding plate 21 is disposed. Said sliding plate is connected to two cables 22, each of which is guided over a cable drum 23. The drums are supported on the same shaft on a frame 17 and can be driven by a motor 24. The cables are guided over horizontal pulleys 25 and vertical pulleys 26 in such a way that through turning of the drums 23 in one or the other direction the sliding plate 21 moves out of the recess of the deposit platform 16a, 16b to the transfer platform 19 or from this platform 19 back into the recess. Each deposit platform 16a, 16b is provided with a ramp 27 on two opposite sides running parallel to the direction of sliding of the sliding plate 21.

Provision is made on the bottom side of the shaft 4 for two hand pallet trucks 31, by means of which general cargo standing on a pallet can be conveyed to a deposit platform 16a, 16b. Via a ramp 27 an operative can move the loaded hand pallet truck onto a sliding plate 21, drop the pallet with general cargo on the sliding plate, and move the truck off the sliding plate via the other ramp. When the frame 17 with the loaded deposit platform has been moved into the highest position with the winch 18, the cable drum 23 is operated in such a way that the sliding plate 21 with pallet rests on the transfer platform 19. The pallet with general cargo can be pushed onto a platform 9 of the conveying system of the crane 3 by means of a push arm 29 operated by hydraulic or pneumatic cylinders 28 (see FIGS. 3 and 13). Provision is made for control means which, once it is established that the transfer platform 19 is loaded, operate the cylinders 28 of the push arm 29 as soon as the front edge of a platform 9 reaches the horizontally placed top part of the bottom part of the conveying system in the shaft 4 of the crane 3. The push arm pushes the pallet with general cargo 12 at the speed of the conveying system onto the above-mentioned platform 9, so that the pallet cannot be damaged during this movement.

The hinge 14 between the infeed device 13 and the shaft 4 is disposed at the height of the transfer platform 19, so that during adjustments of the position of the infeed device 13 to the list of the ship in which the shaft is lowered problems cannot occur with the movement of the general cargo from the transfer platform 19 to a platform 9. Moreover, the tilting movement is controlled by a pneumatic or hydraulic cylinder 30.

In order to permit breaking into the cargo in a ship's hold, a swivelling arm 32 is provided on the cage 15 of the infeed device, said arm being in the form of a rail along which a travelling trolley 33 with hoisting facility 34 can move.

The control box of the infeed device 13 is indicated by 35.

Figure 5:
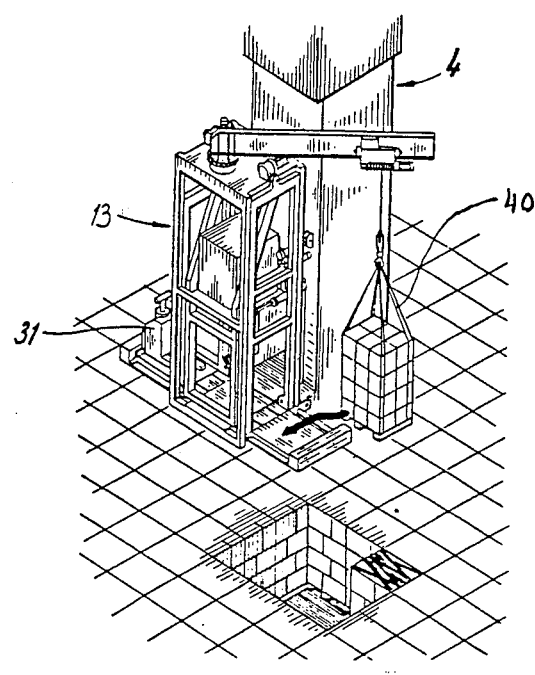
FIGS. 5 to 12 show successive phases of breaking into a consignment of palletized general cargo and the further handling of unloading.
Figure 6:
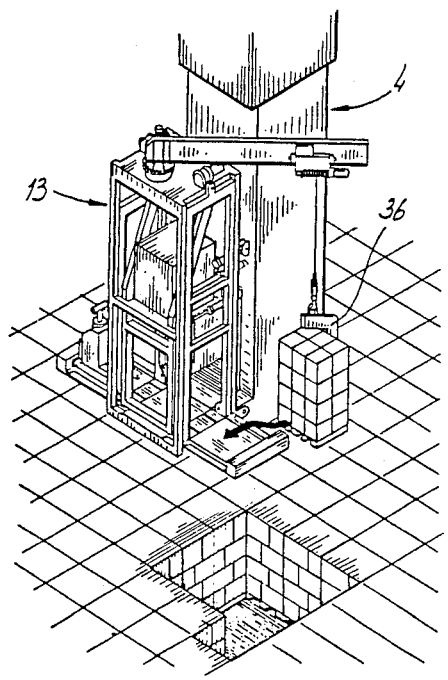

FIGS. 5 to 12 show the different stages of use of the device. FIGS. 5 and 6 show how the swivelling arm 32 breaks into the densely packed consignment of palletized general cargo with the aid of so-called slings 40 or a so-called C-hook 36. Each pallet is placed on a deposit platform 21 and fed by the infeed device described above into the continuous conveying system of the crane 3.

Figure 7:
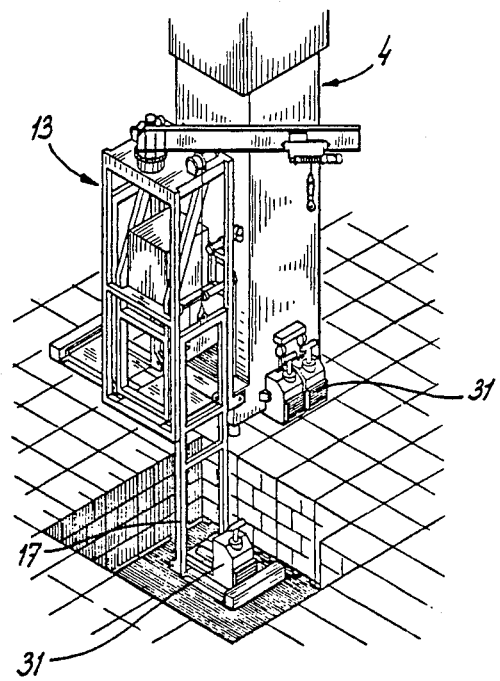
Figure 8:
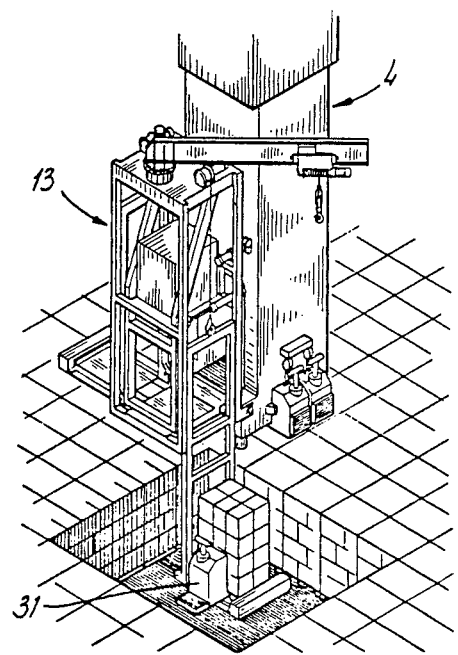
Figure 9:
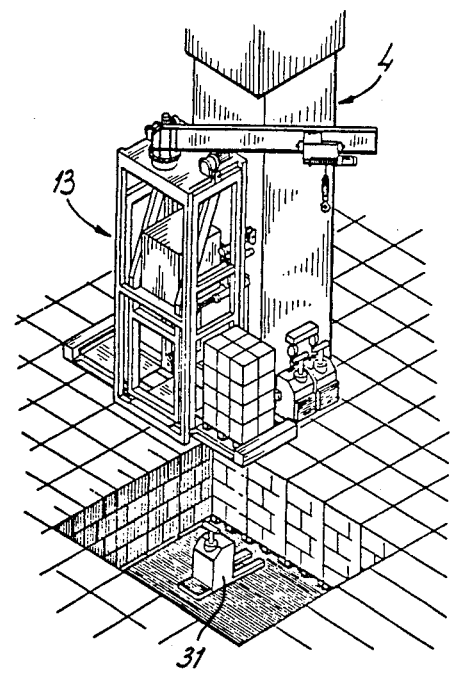
Figure 10:
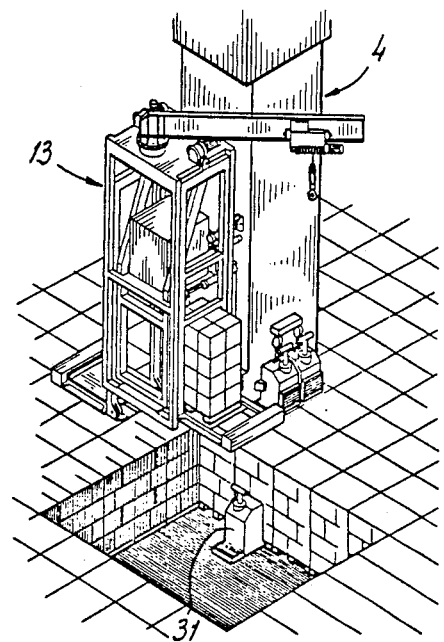
Figure 11:
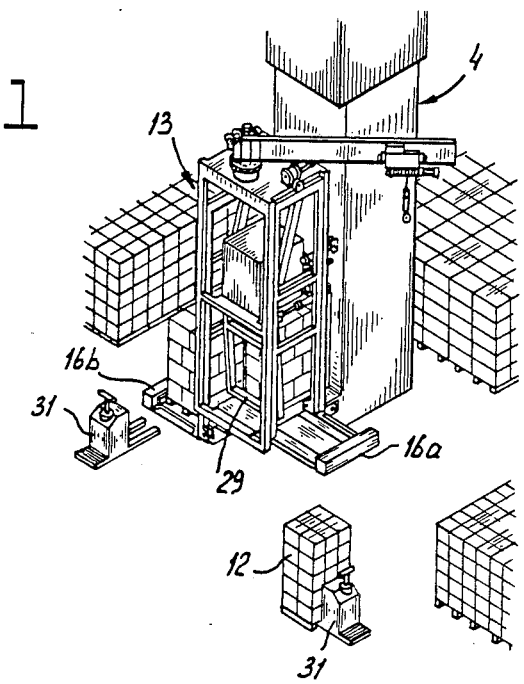
Figure 12:
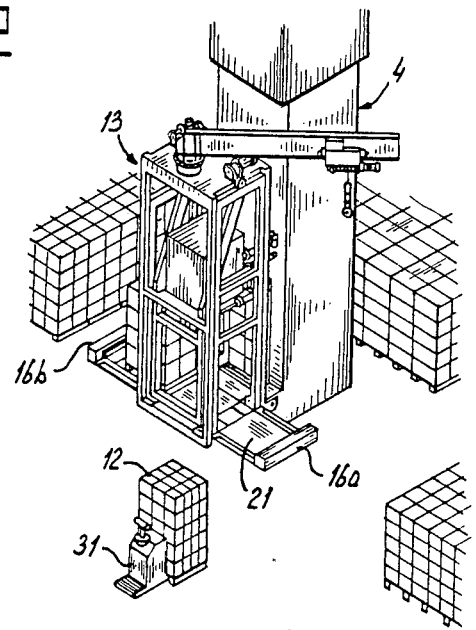

FIG. 7 shows how a hand pallet truck 31 on a deposit platform 16 is taken to the floor part of a ship's hold cleared by the breaking in. FIG. 8 shows how said truck then places pallets on the deposit platform which are fed into the conveying system according to FIGS. 9 to 12, more trucks 31 gradually being used.

Many modifications and variants are possible within the scope of the invention. What is essential for the inventive idea is that general cargo is placed batchwise on a deposit platform which is taken into a position in which the general cargo is fed either directly from said deposit platform or via a transfer platform in a controlled manner into a continuously operating conveying system.

In the event of the general cargo being introduced directly from the deposit platform into the continuously operating conveying system, this platform will have to move not only upwards, but also horizontally in order to be placed in a position adjacent to an admission part of the continuous conveying system. The design with both deposit platform and transfer platform is, however, preferable.

The pallets will be placed at right angles to the lengthwise direction of their supporting bars by means of the sliding plate 21 on the transfer platform 19 and in the lengthwise direction of said bars from the transfer platform 19 on a platform 9 of the conveying system.

Damage to the supporting bars of the pallets is therefore out of the question.

The crane 3 can also be used for loading a ship with palletized general cargo if the general cargo continuously fed in with the device 13 can be loaded smoothly on hand pallet trucks.

The presence of a break-in arm on the frame of the infeed device is extremely important in practice.

Figure 2:
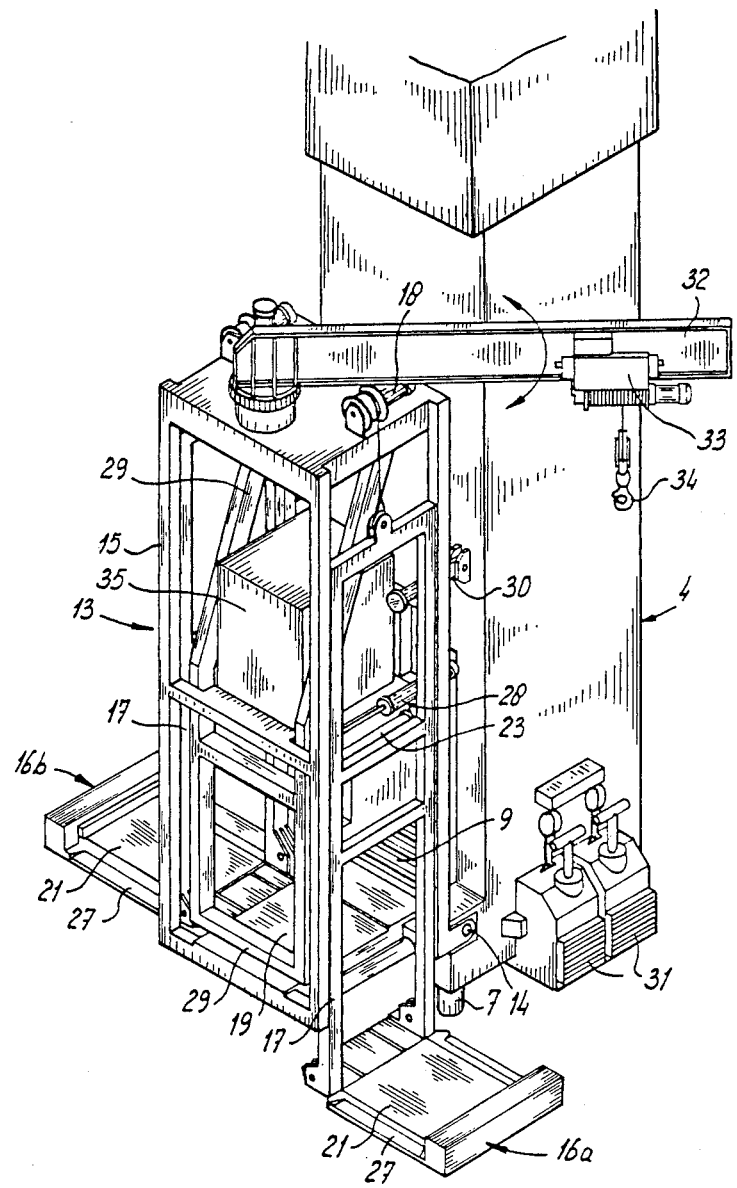
FIG. 2 shows in perspective a view of part of FIG. 1 on a larger scale, in particular showing an infeed unit which permits batch loading of a continuously operating conveyor.

It can be seen from FIG. 2 that the hand pallet trucks (31) are parked in a specific parking place at the bottom of the shaft 4. The C-hook 36 can also be stored in such a way. This means that the pallet trucks and the C-hook do not have to be placed temporarily on the quay for each break-in procedure. They are immediately available, due to the handy storage at the bottom of the shaft.

I claim:

1. General cargo crane for unloading general cargo from a ship's hold, in particular general cargo placed on a pallet, comprising a vertical shaft and an adjacent horizontal conveying part together having disposed therein continuously operating conveyor means, said shaft being vertically displaceable at least with its bottom part, a cage-type frame being provided at the bottom end of the shaft, said frame being provided at at least one side with a deposit platform and lifting means for moving the deposit platform between a lower position in which a general cargo can be deposited on said deposit platform and a higher position in which general cargo can be transferred to a continuously operating conveyor, said cage being provided with a fixed transfer platform at the level of the higher position of the the deposit platform, transfer means being present for transferring general cargo standing on the deposit platform in the higher position thereof onto the transfer platform, the deposit platform being provided with a recess containing a sliding plate, said transfer means for transferring general cargo from the deposit platform to the transfer platform being adapted to shift the sliding plate holding the general cargo, and means being also present for transferring general cargo standing on the transfer platform from said transfer platform to said continuously operating conveyor means.

2. Crane according to claim 1, characterized in that the means for shifting the sliding plate comprise cables which are each guided around a driven cable drum and a number of guide pulleys.

3. Crane according to claim 2, characterized in that a deposit platform is provided on either side of said cage-type frame.

4. Crane according to claim 3, characterized in that the means for transferring general cargo standing on a transfer platform from said platform to the continuously operating conveyor comprise a fluid operated push arm which is suspended hingedly in said cage.

5. Crane according to claim 3, characterized in that provision is made on said cage-type frame for a device for breaking into the cargo of the hold of a ship, in the form of a push arm (32) and a hoisting trolley (33, 34) which can be moved thereon.

6. Crane according to claim 5, characterized in that said deposit platform is provided with two ramp parts for hand pallet trucks.

7. Crane according to claim 6, characterized in that said continuously operating conveyor means comprise conveying platforms (9) which are suspended from chains (8a to 8d), and which are made up of sections (10) which are fastened to links (11a, 11b) of such shape that from the relative position in which the sections form a flat plane they can pivot in only one direction.

8. Crane according to claim 7, characterized in that at the same level as and adjacent to the fixed transfer platform (19) of the infeed device, the conveying system has chain return pulleys, by means of which a conveying platform (9) of the conveying system can be guided into a load-taking position in such a way that the front edge of said conveying platform moves away from the transfer platform (19), while control means are present for operating the push arm (29) of the infeed device once the front edge of said conveying platform begins to move away from the transfer platform (19) on formation of the load-taking position.

9. Crane according to claim 8, characterized in that one or more storage places for hand pallet trucks (31) and a C-hook (36) are provided in the bottom end of the shaft (4).

* * * * *